United States Patent [19]

Welch et al.

[11] Patent Number: 5,348,477
[45] Date of Patent: Sep. 20, 1994

[54] HIGH DEFINITION TELEVISION HEAD MOUNTED DISPLAY UNIT

[75] Inventors: Brian L. Welch, Westmount, Canada; Paul Weissman, Brewster, N.Y.

[73] Assignee: CAE Electronics Ltd, St. Laurent, Canada

[21] Appl. No.: 866,420

[22] Filed: Apr. 10, 1992

[51] Int. Cl.⁵ .................................. G09B 9/00
[52] U.S. Cl. ............................ 434/43; 434/40; 434/44
[58] Field of Search .............. 434/43, 44; 358/87, 358/88, 91; 359/618, 629–631

[56] References Cited

U.S. PATENT DOCUMENTS

| 4,348,185 | 9/1982 | Breglia et al. . |
| 4,439,157 | 3/1984 | Breglia et al. . |
| 4,439,755 | 3/1984 | LaRussa . |
| 4,743,200 | 5/1988 | Welch et al. . |
| 5,134,521 | 7/1992 | Lacroix et al. ............ 434/40 X |

Primary Examiner—Richard J. Apley
Assistant Examiner—Glenn E. Richman
Attorney, Agent, or Firm—Fishman, Dionne & Cantor

[57] ABSTRACT

An optical image is generated by an image source and is transmitted to an optical assembly by a fiber optic cable or cables. The optical assembly includes a transmission lens or lenses, rear projection screens and an eyepiece. By using a rear projection screen in the optical assembly, a non-pupil forming arrangement is provided.

9 Claims, 3 Drawing Sheets

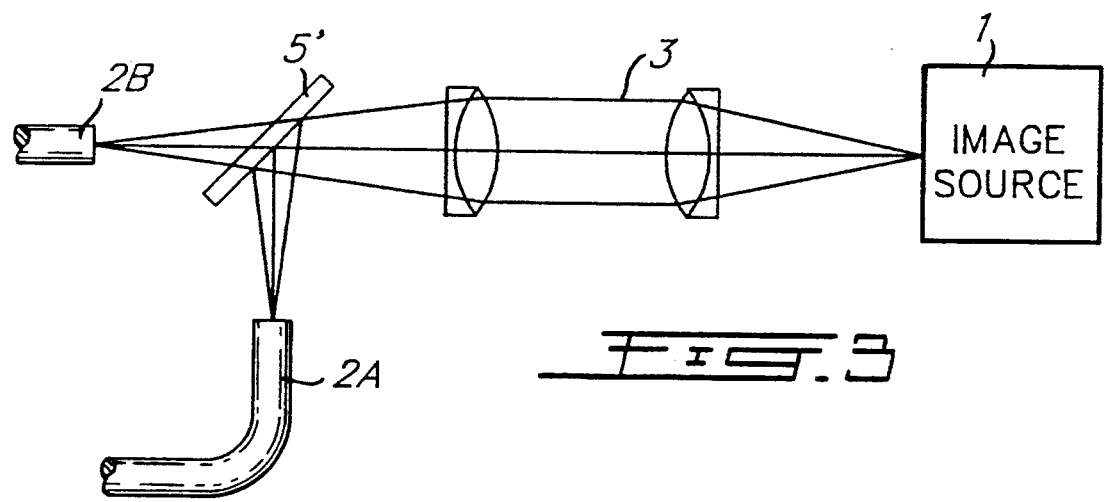
FIG. 3
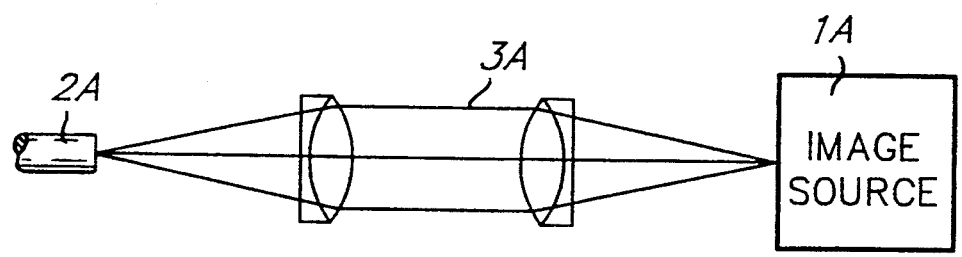
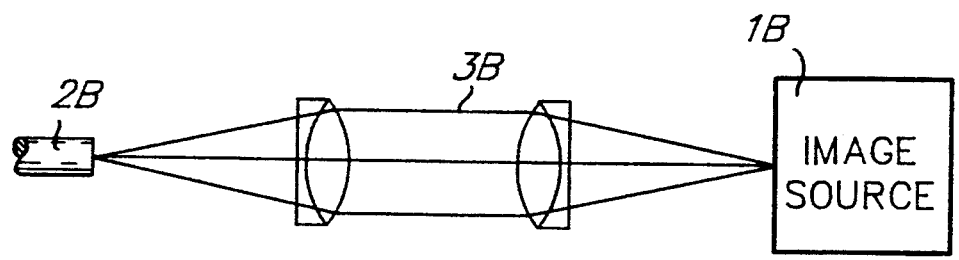
FIG. 4
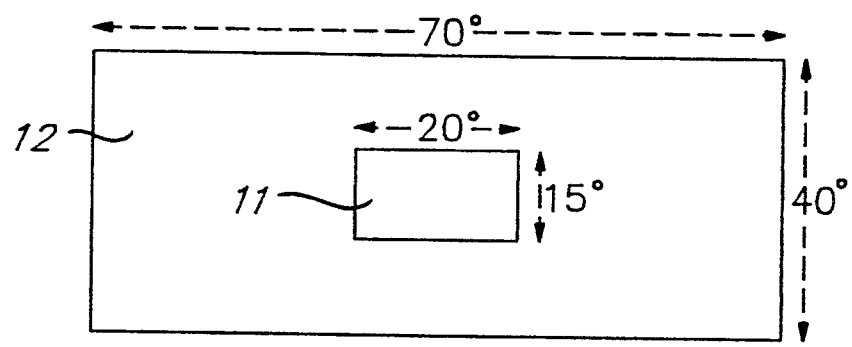
FIG. 5

HIGH DEFINITION TELEVISION HEAD MOUNTED DISPLAY UNIT

BACKGROUND OF INVENTION

1. Field of the Invention

The invention relates to a head mounted display system for producing a replica of an image for viewing by an observer. More specifically, the invention relates to such a system which uses a projection screen as part of an image transmission arrangement in order to obtain a non-pupil forming display.

2. Description of Prior Art

Virtual Reality and Remote Presence are closely related fields in which various devices are used to create an impression in the mind of the subject that he or she is in a different and separate environment from actual reality. The term "Virtual Reality" is usually confined to the use of completely artificial environments, usually created by computer graphic systems. Visual simulation devices used for training pilots etc., are an example of "Virtual Reality". The term "Remote Presence" is usually used in situations where an observer controls the position of one or more television cameras placed at some distance from the observer, and views the resulting image in such a way as to obtain the feeling that he or she is situated in the same position occupied by the cameras.

It is advantageous for both types of systems to use a head mounted display and to control the displayed image by means of the observers head position. The present invention is a particularly advantageous type of just such a display.

Previous systems have used small television displays of various types either mounted on or attached to the head in some way. The observer views the display through an eyepiece to obtain a magnified virtual image. The disadvantage of all these devices is the low resolution, absence of colour or small field of view inherent in their design. The present invention overcomes these shortcomings by using a fiber optic cable to relay an image from a high resolution television projector to the observer's head where it is viewed through wide angle eyepieces.

Helmet displays using fiber optic cables to carry the image from an off-helmet display device to the helmet are known in the prior art as illustrated in, for example, U.S. Pat. No. 4,348,185, Breglia et al, Sep. 7, 1982, U.S. Pat. No. 4,439,157, Breglia et al, Mar. 27, 1984, U.S. Pat. No. 4,439,755 LaRussa, Mar. 27, 1984 and U.S. Pat. No. 4,743,200, Welch et al, May 10, 1988.

In the '185 patent, a visual scene is transmitted by CRT's 37 and 39 through fiber optic cables 51 and 53 respectively. The scene is then transmitted through an optic system including lenses 57 and 59 and beam splitter 61, onto a reflective screen 63. The scene is then reflected from the screen 63 to the eyes of an observer and the data from two optical paths overlap whereby the scene is seen by the observer to appear at optical infinity.

In the '157 patent, computer generated optical images are transmitted through fiber optic cables 20 through a helmet mounted optical system 10 and onto a domed screen (not shown in the drawings).

In the '755 patent, an optical path coupler 14 is secured to a helmet 22 of an observer so that its angular orientation is a function of the head movement of the observer. A display is provided of meter-type data and/or topographical features in the ordinary line of site of the observer.

In the '200 patent, an optical image is fed, via a fiber optic cable, to an eyepiece of an observer. The eyepiece is preferably a wide angle eyepiece mounted on the helmet of the observer. A replica of the image is produced in the line of site of the observer, the replica appearing to originate at a distance.

The '755 patent, the '200 patent, and the '185 patent all include within their teachings means for tracking the head movements of the observer, and the '157 patent includes within its teachings means for tracking the eyes of the observer.

The above-described systems are not suitable for general use due to their size, cost and complexity.

SUMMARY OF INVENTION

It is therefore an object of the invention to provide a display system which can be produced for a relatively low cost, which is reasonably compact and which embodies features which make it suitable for general use in most virtual reality and remote present applications.

It is a more specific object of the invention to provide such a system which uses a projection screen as part of an image transmission arrangement in order to obtain a non-pupil forming display.

In accordance with a particular embodiment of the invention there is provided A display system for producing a replica of an image for viewing by an observer, comprising:
  A) means for generating said image;
  B) an optical assembly comprising:
    i) a projection screen means;
    ii) fiber optic cable means for transmitting said image to said projection screen means;
    iii) eyepiece means disposed in front of the eyes of said observer;
  said projection screen means transmitting said image to said eyepiece means;
  whereby a non-pupil forming display of a replica of said image, which appears to originate from a great distance, is viewable by said observer.

BRIEF DESCRIPTION OF DRAWINGS

The invention will be better understood by an examination of the following description, together with the accompanying drawings, in which:

FIG. 3 illustrates a second embodiment of the invention;

FIG. 4 illustrates a third embodiment of the invention; and

FIG. 5 illustrates a typical field of view of a display system in accordance with the invention.

DESCRIPTION OF PREFERRED EMBODIMENTS

Figure 1:
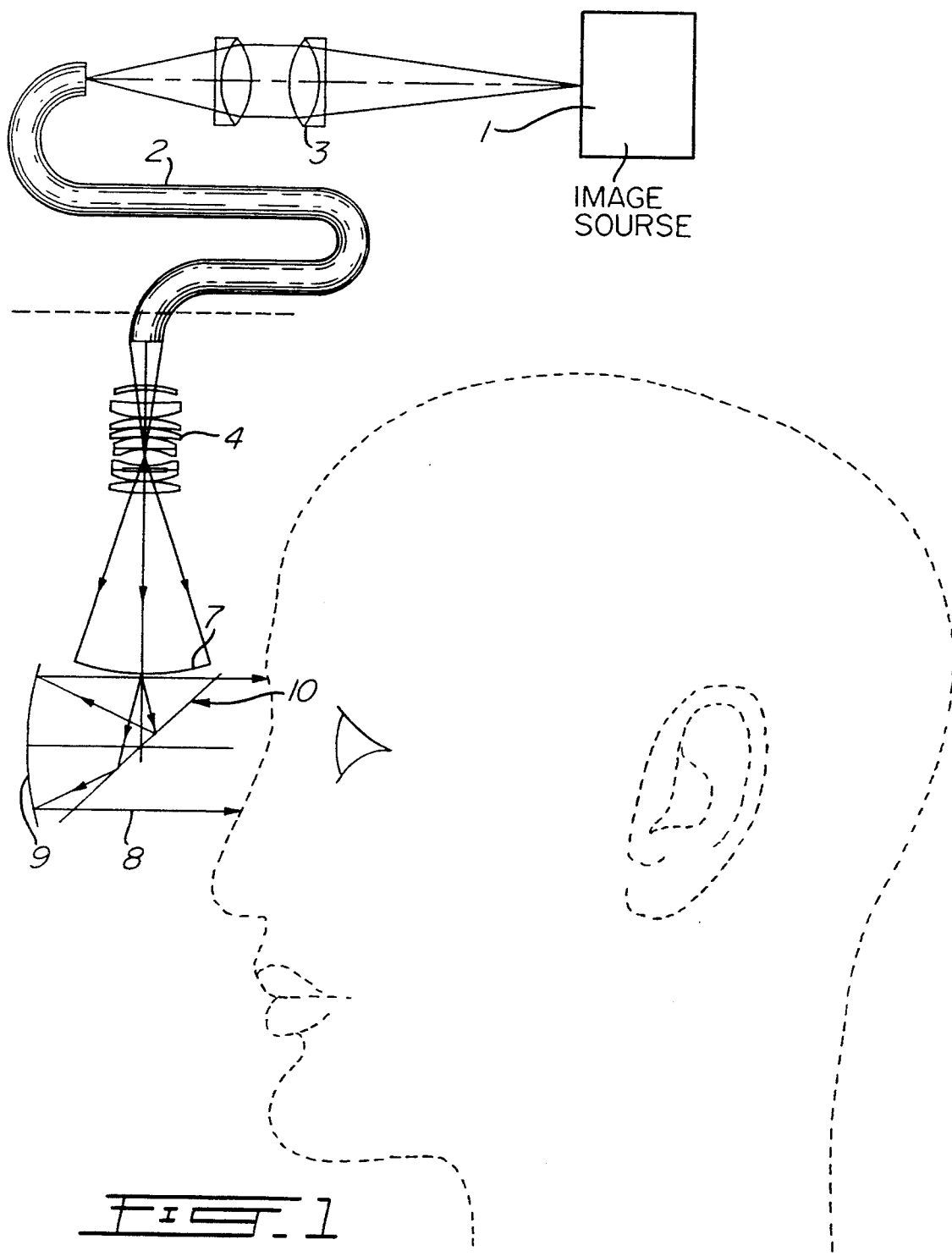
FIG. 1 is an optical schematic of a display system in accordance with the invention viewed from the side.

Referring to FIG. 1, an image, which is generated by an imaging source 1, which can be a television projector, is relayed to the input end of a fiber optic bundle 2 through a relay lens 3. The image is then transmitted to an optical assembly consisting of a projection lens 4, a rear projection screen 7 and an eyepiece 8. The eyepiece 8 uses a spherical mirror 9 and a flat beam splitter 10. This spherical mirror can be replaced by a spherical beam splitter which allows the observer to see the real world as well as the image on the screen 7. This may be an advantage in those applications where the observer needs to interact with his real environment. Other eyepieces, well known in the art, can be used.

Figure 2:
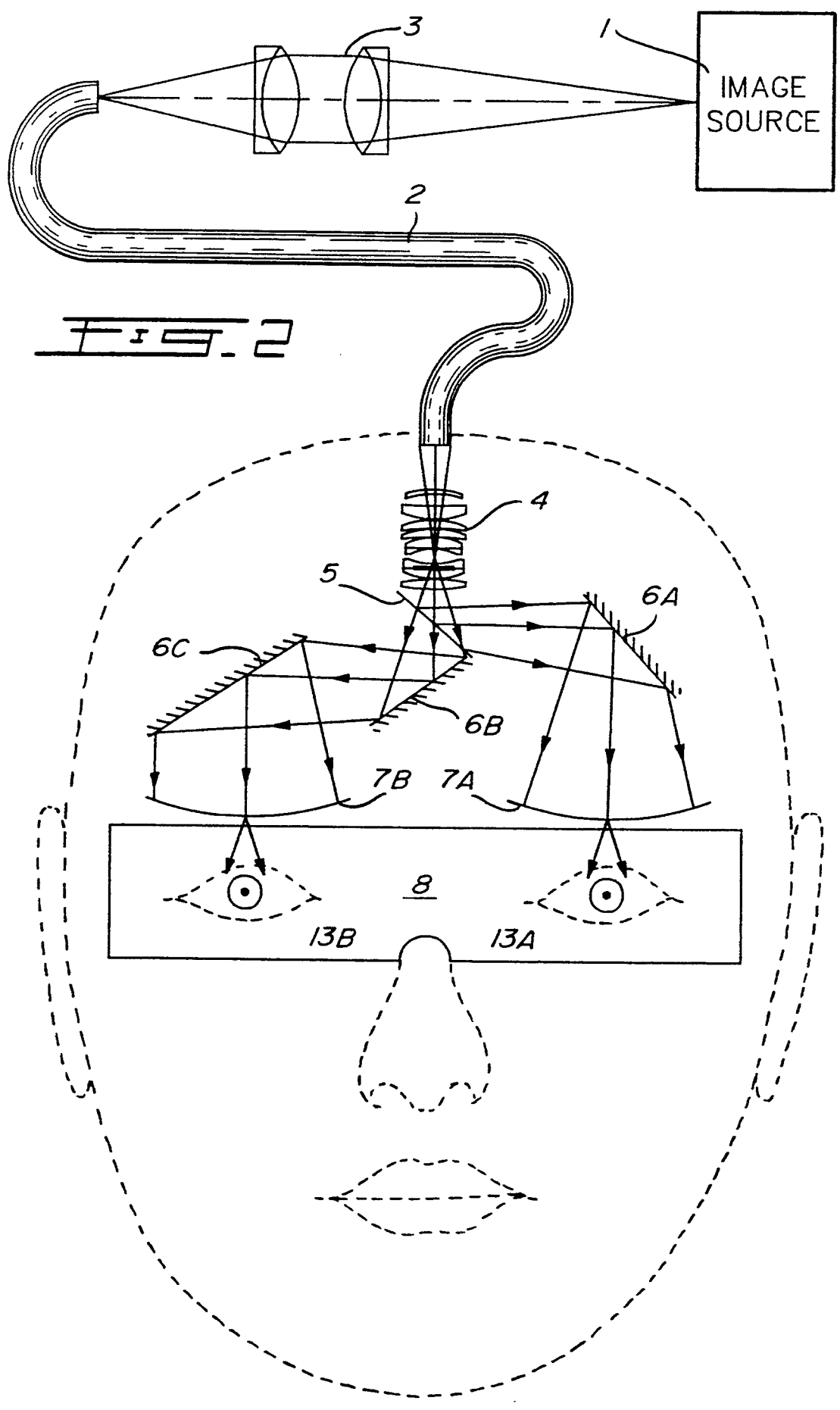
FIG. 2 is a front view of the embodiment illustrated in FIG. 1.

Turning to FIG. 2, it can be seen that the beam splitter 5 deflects part of the output of the projection lens 4 to a mirror 6A which reflects the light beam to rear projection screen 7A which is on top of one part of eyepiece 8 which is in front of eye 13A of the observer.

The beam splitter 5 transmits the remainder of the light beam to a mirror 6B which in turn reflects it to mirror 6C and then to rear projection screen 7B. Rear projection screen 7B is on top of that part of the eyepiece 8 which is in front of the eye 13B of the viewer.

In a second embodiment of the invention, the image is transmitted by two fiber optic cables as illustrated in FIG. 3. As seen in FIG. 3, beam splitter 5' deflects part of the image to a first fiber optic cable 2A. The rest of the image from the beam splitter 5' is transmitted to a second fiber optic cable 2B. The output of 2B is optically transmitted to a first projection lens (as projection lens 4 in FIG. 1), and the output of 2A is similarly transmitted to an identical projection lens. The output of each projection lens is then transmitted to a rear projection screen as in 7 of FIG. 1, and the output of the two rear projection screens are transmitted to an eyepiece 8. The projection lenses, rear projection screens and eyepiece are not illustrated in FIG. 3.

In a third embodiment of the invention, shown in FIG. 4, two image sources 1A and 1B feed respective fiber optic cables 2A and 2B through respective relay lens 3A and 3B. The fiber optic cable outputs are transmitted by respective projection lens (not shown) to respective rear projection screens, one for each eye (also not shown) to the eyepiece. With this arrangement, it is possible to provide a stereoscopic image.

In all cases, the replica of the image carried by the fiber optic cable or cables is seen through the eyepiece and appears to originate at a distance. It is also possible for the replica of the image to be combined with the direct view of objects seen through the eyepiece so that the observer is able to see the real world as well as the image on the screens 7. This will be an advantage in applications where the observer needs to interact with his real environment. The invention would normally be used with a position sensing means to measure the position and attitude of the observer's head. Such devices are well known in the art and require no further description. This information is used by the device producing the image so that the observer sees an appropriate image wherever he or she looks. The device producing the image may be a computer graphics system or any other device capable of storing a representation of the environment which the observer wishes to view. A head velocity sensing device may also be used to some advantage in order to reduce the effect of transport delay of the overall system.

In the preferred embodiment of the invention, the image source comprises a high definition television (HDTV) projector. Other projection devices with suitable optical characteristics may also be used.

A typical field of view seen by the observer is shown in FIG. 5. Normally this field of view would have a uniform resolution and level of detail determined by the characteristics of the HDTV projector or any other device producing the image. In an alternative arrangement, only the central part 11 of the field of view would have a high resolution, and a high level of detail. The surrounding peripheral field 12 would have a lower resolution and level of detail. This arrangement tends to match the performance of the human visual system. The main advantage of this arrangement is to reduce the cost and size of the device producing the image. In the most advantageous embodiment of this arrangement, the central area of high resolution and high detail would be slaved to the eye position of the observer. In this case, the invention would include an eye tracking device. Eye tracking devices are known in the art and require no further description at this time.

The relay lens 3 includes optical elements to produce the correct mapping function to ensure the image seen by the observer through the eyepiece 8 is essentially free of any geometric distortion. Other techniques well known in the art may also be used.

Also in accordance with the invention an image enhancement technique such as "wave length multiplexing" as described in Fiber Optics Principals in Medicine, W. Siegmund et al, Annuals of the New York Academy of Sciences, Vol. 157, 1969 or "dynamic scanning" as described in Fiber Optics Principals and Applications, N. G. Kapany, 1967, is used to reduce the visibility of the physical structure of the fiber optic bundle 2 and to increase the resolution of the fiber optic bundle 2.

The use and inclusion of the rear projection screen or screens 7 is a particularly advantageous feature of the invention as the use of such a screen makes the systems non-pupil forming. In the Welch et al patent, above referred to, there is taught an example of a pupil forming system where the eyepiece views an aerial image. The observer must place his or her eye in the pupil, which is relatively small, in order to see the complete image. In the present invention, the position of the eye relative to the eyepiece is not as critical making the device more suitable for general use.

FIG. 1 shows the physical relationship of the head mounted optical assembly to the observer's head. The optical assembly could be fixed to a helmet and worn in a similar manner to the patents previously described or it could be attached to the head in some other manner.

Although particular embodiments have been described, this was for the purpose of illustrating, but not limiting, the invention. Various modifications, which will come readily to the mind of one skilled in the art, are within the scope of the invention as defined in the appended claims.

We claim:

1. A display system for producing a replica of an image for viewing by an observer, comprising:
   A) means for generating said image;
   B) an optical assembly comprising:
      i) a rear projection screen means;
      ii) eyepiece means disposed in front of the eyes of said observer;
   C) fiber optic cable means for transmitting said image from said means for generating to said projection screen means; and ·
      projection lens means between said fiber optic cable means and said projection screen means;
      said projection screen means transmitting said image to said eyepiece means;
      said projection lens means and said projection screen means being arranged to form a coaxial optical system;

whereby a non-pupil forming display of a replica of said image, which appears to originate from a great distance, is viewable by said observer.

2. A system as defined in claim 1 wherein said means for generating said image comprises a high definition television.

3. A system as defined in claim 2 wherein said eyepiece means comprises a left eye portion and a right eye portion;

said rear projection screen means comprising a left rear projection screen means associated with said left eye portion and a right rear projection screen means associated with said right eye portion.

4. A system as defined in claim 3 and including relay lens means disposed between said high definition television and said fiber optic cable means.

5. A system as defined in claim 4 wherein said fiber optic cable means comprises a right fiber optic cable and a left fiber optic cable;

beam splitter means between said high definition television and said right and left fiber optic cables whereby said replica of said image originating from said high definition television is provided to said right fiber optic cable and said left fiber optic cable;

the output of said right fiber optic cable being transmitted to said right rear projection screen, and the output of said left fiber optic cable being transmitted to said left rear projection screen.

6. A system as defined in claim 5 and wherein said projection lens means comprises a right projection lens between said right fiber optic cable and said right rear projection screen and a left projection lens between said left fiber optic cable and said left rear projection screen.

7. A system as defined in claim 5 wherein said fiber optic cable means comprises a single fiber optic cable;

a beam splitter between said fiber optic cable and said right rear projection screen and said left rear projection screen;

whereby, the output of said fiber optic cable is transmitted to said right rear projection screen and said left rear projection screen.

8. A system as defined in claim 7 and including a projection lens between the output of said fiber optic cable and said beam splitter.

9. A system as defined in claim 4 wherein said fiber optic cable means comprises a right fiber optic cable and a left fiber optic cable;

and wherein said relay lens means comprises a right relay lens and a left relay lens;

said means for generating said image comprising a right image source and a left image source;

said image generated by said right image source being transmitted to said right fiber optic cable through said right relay lens and said image generated by said left image source being transmitted to said left fiber optic cable by said left relay lens;

and further including a right projection lens and a left projection lens;

said right projection lens being between the output of said right fiber optic cable and said right rear projection screen means and said left projection lens being between the output of said left fiber optic cable and said left rear projection screen means.

* * * * *